Oct. 8, 1935.  W. A. TRYON  2,016,757
WEAR COMPENSATING BEARING
Filed May 14, 1931
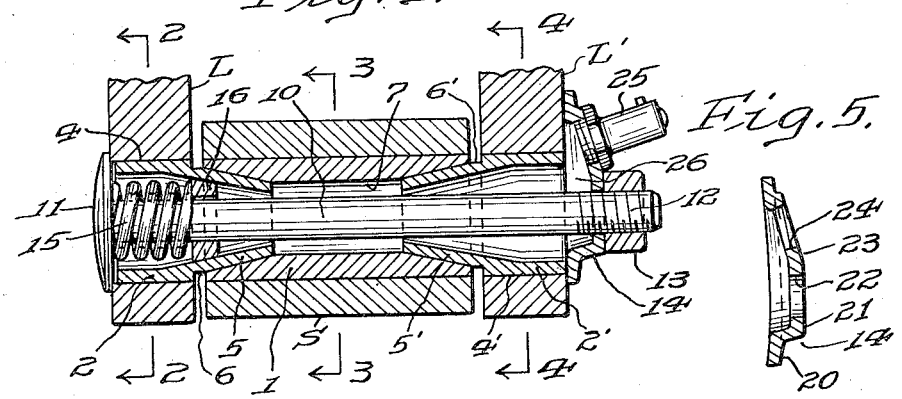
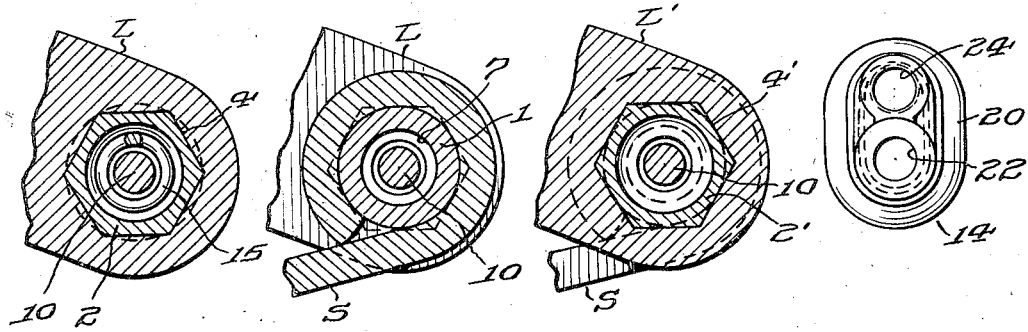
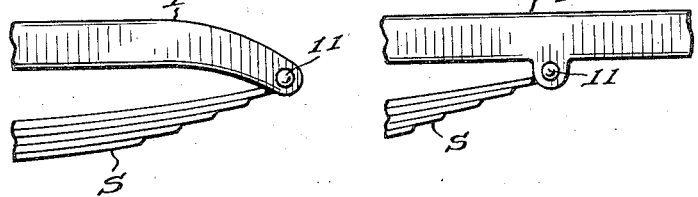
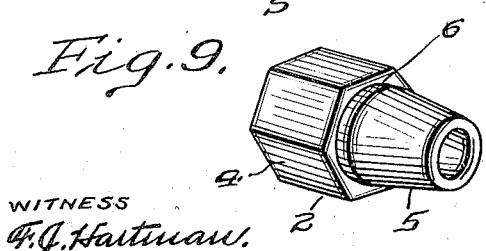
INVENTOR
William A. Tryon.
BY
ATTORNEYS
WITNESS
F. J. Hartman.

Patented Oct. 8, 1935

2,016,757

UNITED STATES PATENT OFFICE 2,016,757

WEAR COMPENSATING BEARING

William A. Tryon, Elmira, N. Y., assignor to Trayer Bolt Company, Inc., Elmira, N. Y., a corporation of New York Application May 14, 1931, Serial No. 537,315

3 Claims. (Cl. 308—70)

The principal object of the present invention is to provide a wear compensating bearing suitable for forming a connection between two relatively movable members and operative to automatically compensate or take up such wear as may occur between the relatively moving bearing surfaces so as to eliminate looseness or lost motion and constantly preserve a proper and adequate bearing engagement therebetween.

My improved wear compensating bearing is therefore capable of numerous and varied uses and applications, but is particularly adapted for installation at various points in an automobile such, for example, as the points of attachment of the forward ends of the springs to the frame, or in the steering knuckles or front axle spindle bearings, or at the points of connection of the cross tie rod with the steering arms in the steering mechanism, similarly to the wear compensating bearing for which Letters Patent of the United States 1,712,310 were granted to Charles H. Sayre on May 7, 1929, and, in some respects, upon which the present invention may be considered an improvement.

For convenience of description, therefore, but not by way of limitation or restriction, I shall herein refer more particularly to the employment of the bearing as a connecting medium between the front ends of the front or rear springs of an automobile and the frame thereof, the bearing in such instances being employed in place of the usual bolt which extends through the laterally spaced ears of the spring horn at the front end of the side frame member and through the spring eye bushing of the front spring disposed between them, or through the laterally spaced depending ears of a spring hanger secured to the side frame member and the spring eye bushing of the rear spring disposed between said ears.

In addition to the principal object of my invention to which I have referred, further objects thereof are to provide a wear compensating bearing affording adequate bearing area between the relatively moving bearing surfaces and one in which the parts are of sufficient size to afford the strength requisite to sustain the required load without increasing the external dimensions of the parts to a point which would prevent the use of the bearing in automobiles or other machinery designed for the plain bearings ordinarily employed at those points at which my improved bearing may desirably be utilized, thus enabling the latter to be installed as factory equipment on new cars or as replacements on old cars without necessity of material alterations or modifications of the design thereof.

A still further object of the invention is to provide a wear compensating bearing of simple design and construction comprising but a relatively small number of parts of a character suitable for efficient and economical manufacture, thus enabling the bearing to be employed without material increase in cost over the plain bearings ordinarily utilized at similar points.

A still further object of the invention is the provision of a wear compensating bearing so constructed and arranged that lubricant need only be supplied at relatively infrequent intervals in order to maintain the wearing surfaces in properly lubricated condition.

My invention further includes other objects and novel features of design, construction and arrangement hereinafter more particularly mentioned or which will be apparent from the accompanying drawing in which I have illustrated a bearing constructed in accordance with the principles of my invention and suitable for connecting the front ends of automotive springs to the members carried by the car frame to which such connection is customarily effected.

In the said drawing, Fig. 1 is a vertical central section showing the bearing installed as the connecting medium between an end of one of the springs of an automobile and the spring horn or spring hanger of the frame thereof, and Figs. 2, 3 and 4 are respectively transverse fragmentary sections on the lines 2—2, 3—3 and 4—4 in Fig. 1. Fig. 5 is a central section of the spring washer which I prefer to employ in an installation of this character for retaining the nut upon the main bolt hereinafter referred to, and Fig. 6 is a front elevation thereof. Fig. 7 is a fragmentary side elevation on a reduced scale showing the front end of an automobile frame with the front end of the forward spring attached thereto by the bearing shown in the preceding figures, and Fig. 8 is a similar view showing the forward end of the rear spring similarly attached to a hanger or bracket depending from the car frame, while Fig. 9 is a perspective view of one of the bearing studs. Like symbols are used to designate the same parts in the several figures.

More particularly, referring to the drawing, L, L' represent laterally spaced depending ears or lugs forming integral parts of or permanently attached to the frame F and between which the eye of the spring S is disposed. The lugs L, L' may thus be considered as typical of any member or element to which another element, typified by the spring S, is to be connected through the medium of the wear compensating bearing of my invention in such manner as to be capable of relative movement with respect thereto. Thus, for example, the lugs L, L' might be a portion of the yoke at the end of an automobile axle and the part S the steering spindle from which extends the stub axle on which the wheel is journaled, or L, L' might typify the yoke at the end of the cross tie rod of the steering mechanism and S a portion of the steering arm, as will be readily understood.

Within the spring eye is disposed a hollow bushing 1, which may desirably be exteriorly cylindrical and which is pressed or otherwise disposed in the spring eye or other analogous part so as to be operatively rigid therewith. The bushing is axially bored and provided adjacent its ends with outwardly and oppositely tapered bearing surfaces respectively adapted to bear upon corresponding bearing surfaces or regions of the hollow bearing elements or studs 2, 2' respectively carried by the members L, L'. Each of these studs, which are of generally similar construction, comprises a shank 4 of polygonal cross section and a conical end portion 5 adapted to enter the adjacent conical or tapered end of the bushing 1 so that the outer surface of the coned portion of the stud and conical surface of the bushing are in mutual bearing engagement when the parts are assembled, whereby the bushing and the eye or other part in which it is disposed can rotate about the studs which are disposed in opposed, axially aligned relation. Desirably, and as shown, each stud is also provided with a short cylindrical zone or region 6 lying between its polygonal shank and its conical portion, the diameter of this region approximating that of the outer or larger end of the conical bore in the bushing 1. The function of this cylindrical region is to permit the studs to gradually enter the bushing as wear occurs between the mutually cooperative bearing surfaces of the parts, as it will be apparent that if the tapered surfaces of the studs were continued clear to the polygonal shanks, the sharp corners of the bushing at the junction of its conical surfaces and end faces would tend to cut into the conical surfaces of the studs as the latter, under the influence of the means hereinafter described, tended to approach each other upon the occurrence of wear. However, since in the preferred construction to which reference has just been made, the diameter of the conical portion of each stud is never greater than the internal diameter of the bushing at its ends, and since for a like reason the internal diameter of the smaller ends of the studs are always desirably made equal to or less than the internal diameter of the usually cylindrical bore 7 in the center of the bushing, the corners at the ends of the bushing cannot cut into the studs, nor the corners at the ends of the studs cut into the bushing as the studs gradually move inwardly toward each other upon the occurrence of wear between the mutually cooperative conical surfaces.

For supporting the studs, the members L, L' are respectively provided with aligned openings, conveniently formed by means of a suitable broach, conforming to the polygonal shanks of the studs, the size of the openings being such that the shanks form a snug sliding fit therein, their polygonal conformation, however, preventing any axial rotation.

A bolt 10 desirably provided with a substantially flat head 11 of sufficient diameter to overlie the opening in the adjacent member L and thus prevent the adjacent stud from moving outwardly and a body of a diameter slightly less than the smallest internal diameter of the studs, is extended axially through the latter and the bushing 1 disposed between them and is provided on its end with threads 12 adapted for the reception of a nut 13. Between this nut and the face of the adjacent member L' is disposed a spring or lock washer 14, hereinafter more particularly described, which serves to prevent the adjacent stud 2' from moving outwardly and the nut from backing off after it is drawn up to operative position.

Since under normal conditions of operation a certain amount of wear takes place between the conical ends of the studs and the conical surfaces of the bushing 1 which would result, in the course of time and in the absence of compensation therefor, in looseness and lost motion in the bearing with consequent rattling and unsatisfactory operation, means are provided for yieldingly urging studs against the bearing surfaces of the bushing so as to constantly maintain the proper snugness of fit by taking up the wear between the parts, said means comprising a coil spring 15 loosely surrounding the bolt adjacent its head and seating at one end against the inner face of the latter and at the other against an annular washer 16 disposed in the adjacent stud 2; desirably, the periphery of this washer is slightly beveled as best shown in Fig. 1 so as to snugly engage the inner surface of the stud in the vicinity of the larger end of its conical region. Thus, when the parts are operatively assembled, the spring is maintained in a state of compression between the washer and the head of the bolt, the ends of the spring being preferably flattened so as to form a good bearing against the adjacent faces of the washer and head.

It therefore results that the spring is effective to continuously urge the adjacent stud 2 toward the bushing 1 so as to maintain a proper bearing engagement between the conical surface of the stud and the corresponding surface of the bushing, and likewise to urge the bushing toward the stud 2' so as to maintain a corresponding engagement between the conical surface of the latter and the adjacent conical surface of the bushing whereby as wear occurs between the mutually cooperative bearing surfaces it is immediately taken up and the requisite snugness of fit constantly maintained.

Mention has been made of the washer 14 which, as may best be noted from Figs. 5 and 6, is of somewhat peculiar shape. This washer embodies a marginal rim 20 of sufficient size to overlie the adjacent end of the stud 2' so as to prevent the latter from moving outwardly in its supporting member L' and also has an outwardly offset central boss a portion 21 of which, through which is extended the bolt hole 22, lies normal to the axis of the latter and another portion 23 of which lies at an angle thereto; in this angularly disposed portion an internally threaded hole 24 is provided for the reception of an "Alemite" or other suitable fitting 25 through which lubricant can be injected into the bearing. As best shown in Fig. 5, the rim 21 is initially slightly curved or cambered outwardly, so that as the nut 13 is screwed down against the portion 21, the washer will be placed in a state of compression and thus exert a reaction against the nut to prevent the latter from backing off.

A washer of this character, while not an essential element of the invention, is desirable in certain installations since it provides a convenient point of location for the "Alemite" fitting 25 through which light grease or other suitable lubricant may be introduced to the cavity 26 in the under face of the washer and thence through the adjacent stud to the chamber or reservoir 7 in the bushing and interior of the other stud 2 at least as far as the washer 16; under these conditions, when the bearing is in use, the lubricant works out from the chamber 7 onto the cooperative conical bearing surfaces, some or all of which, if desired, may be provided with oil grooves communicating with the chamber to facilitate the distribution of the lubricant. However, in other installations, and particularly those in which the bolt is of a relatively considerable diameter, an ordinary form of lock washer may be employed instead of the washer 14 and the bolt provided with an axial passage communicating with the chamber 7 and enlarged and threaded at its outer end to receive the "Alemite" fitting so that the lubricant may be injected directly into the chamber through the bolt; however, when the bolt is of relatively small diameter, the use of the washer 14 will usually be found preferable for the reasons stated.

From the foregoing it will be apparent that my improved wear compensating bearing is of very simple construction and can be manufactured very cheaply on a production basis since the studs can be formed from lengths of tubular stock by means of suitable dies; the bolts can be produced in automatic bolt making machines from suitable round stock; the washers 14, if employed, can be stamped from sheet metal, and the bushings 1 also produced from tubular stock. It will further be observed that the bolt is not a weight carrying member and can thus be made of relatively small diameter with consequent saving in stock, while the various parts of the bearing may be assembled very readily and thereafter require no adjustment or attention other than the replenishing of the lubricant throughout their operative life.

While I have herein described and illustrated one embodiment of my invention with considerable particularity, I do not thereby desire or intend to confine or restrict myself specifically thereto as modifications may be made in the form, construction and arrangement of the various parts to adapt the bearing to various uses or to meet varying conditions of installation, without departing from the spirit and scope of the invention as defined in the appended claims.

Having thus described my invention, I claim and desire to protect by Letters Patent of the United States:

1. In combination with relatively movable members, a wear compensating bearing forming a connection therebetween and comprising a bushing seated in one member and having conical bearing regions adjacent its ends, a pair of hollow bearing elements supported in spaced relation in the other member and having conical regions respectively cooperative with the bearing regions in the bushing, a headed bolt extending through both elements and the bushing, a spring surrounding the bolt between its head and the adjacent bearing element and normally in a state of compression, a nut carried by the bolt adjacent the other bearing element, and a spring washer interposed between the nut and the adjacent member.

2. In combination with relatively movable members, a wear compensating bearing forming a connection therebetween and comprising a bushing seated in one member and having conical bearing regions adjacent its end, a pair of hollow bearing elements supported in spaced relation in the other member and having conical regions respectively cooperative with the bearing regions in the bushing, a headed bolt extending through both elements and the bushing, a spring surrounding the bolt between its head and the adjacent bearing element and normally in a state of compression, a nut carried by the bolt adjacent the other bearing element, and a spring washer interposed between the nut and the adjacent member, said washer comprising a cavity communicating with the interior of the adjacent bearing element and a lubricant fitting carried by the washer through which lubricant can be introduced into said cavity.

3. In combination with relatively movable members, a wear compensating bearing forming a connection therebetween and comprising a bushing seated in one member and having conical bearing regions adjacent its ends, a pair of hollow bearing elements supported in spaced relation in the other member and having conical regions respectively cooperative with the bearing regions in the bushing, a headed bolt extending through both elements and the bushing, a spring surrounding the bolt normally maintained in a state of compression and abutting at one end against one of the bearing elements, a nut carried by the bolt, and a spring washer interposed between the nut and the adjacent member.

WILLIAM A. TRYON.